United States Patent [19]

Wackerle et al.

[11] Patent Number: 4,863,207

[45] Date of Patent: Sep. 5, 1989

[54] DISC WHEEL, PARTICULARLY FOR RAIL VEHICLES

[75] Inventors: Peter-Martin Wackerle, Assling; Josef Grober, Putzbrunn; Franz Sperber, Kolbermoor, all of Fed. Rep. of Germany

[73] Assignee: Messerschmitt-Bòlkow-Blohm GmbH, Munich, Fed. Rep. of Germany

[21] Appl. No.: 193,342

[22] Filed: May 12, 1988

[30] Foreign Application Priority Data

May 14, 1987 [DE] Fed. Rep. of Germany ....... 3716070

[51] Int. Cl.⁴ .............................................. B60B 17/00
[52] U.S. Cl. ....................................... 295/21; 295/15; 301/63 DD
[58] Field of Search ...................... 295/7, 8, 11, 15, 21, 295/22, 23; 301/63 PW, 63 DD

[56] References Cited

U.S. PATENT DOCUMENTS

| | | | |
|---|---|---|---|
| 974,549 | 11/1910 | Bryant et al. | 295/7 |
| 2,097,982 | 11/1937 | Kist et al. | 295/15 X |
| 3,695,728 | 10/1972 | Haussels | 301/63 DD |
| 4,067,600 | 1/1978 | Knorr et al. | 295/23 |
| 4,200,326 | 4/1980 | Wilcox | 295/23 |
| 4,571,005 | 2/1986 | Nowak et al. | 295/23 X |
| 4,699,417 | 10/1987 | Spiller et al. | 295/23 X |

Primary Examiner—Robert B. Reeves
Assistant Examiner—Frank Williams
Attorney, Agent, or Firm—Kenyon & Kenyon

[57] ABSTRACT

A disc wheel, particularly for rail vehicles, with a composite metal/plastic structure. In order to make possible simple manufacture with at the same time adequate force transmission, a structure between the hub and the tread comprises a plastic structure comprising two half shells of the same design which are subdivided in sector fashion by spoke-like reinforcement ribs. The reinforcement ribs each have a longitudinal slot into which rib plates are inserted which connect the two half shells to each other. Advantageously, plastic foam is inserted into the cavities of the half shells. All joints between the plastic structure and the hub or the tread are cemented joints.

5 Claims, 3 Drawing Sheets

DISC WHEEL, PARTICULARLY FOR RAIL VEHICLES

BACKGROUND OF THE INVENTION

The present invention relates to a disc wheel, particularly for rail vehicles.

It is known to manufacture such disc wheel, for instance, railroad wheels, from a composite of metal and fiber-reinforced materials. Examples therefor are shown in German Patent Nos. 33 45 555 and 35 06 007. Through such a composite structure, the weight of the disc wheels can be reduced in comparison with otherwise purely metal wheels. By the structural damping of the fiber-reinforced materials used, also the noises occurring during operation are reduced. In addition, the forces occurring during operation on the disc wheel in the radial, axial and circumferential direction can be adapted to the required strength and stiffness properties.

The disc wheel according to the above-mentioned German Patent No. 35 06 007 comprises as the thrust transmission body a Z-rib body which consists, for insance, of shell-like segments which follow each other without gap in the circumferential direction of the disc wheel and which rest with their radially inward and outward side walls against the hub and the tread, respectively, in the region between the flanges located there and with their side walls extending between the hub and the tread against side walls of adjacent segments and are cemented to the latter. The shell bottoms of successive segments are located on opposite sides of the disc wheel. Cover discs are further cemented on this thrust transmission body on both sides. The cavities of the segments can be foamed up with plastic material.

The disc wheel according to the above-mentioned German Patent No. 33 45 555 comprises two hub halves which have mirror symmetry in the axial direction and each have circumferential flanges at the axial outer rims. The thrust transmission body is, for instance, a honeycomb structure of plastic, aluminum or the like. The cover discs are connected to the circumferential flanges of the hub halves by means of a two-section joint.

In both known disc wheels, the individual parts are cemented together. Other connections are not required. However, the cemented joints between metal parts and the rest of the wheel structure of fiber-reinforced materials are stressed in transverse tension due to the stresses of the rail wheel in operation.

The necessary designs of the metal parts to be joined are still relatively costly, especially in the disc wheel according to German Patent No. 33 45 555 and require increased costs for chip removal machining, as, for instance, in the case of undercuts.

The manufacturing procedure for the disc wheel according to the German patent No. 35 06 007 is relatively complicated since especially the shell-shaped segments of fiber-reinforced materials can be processed only in the wet or in the half-dried state.

SUMMARY OF THE INVENTION

It is an object of the present invention to provide a disc wheel of the kind under discussion, the design of which is simple and makes possible an equally simple manufacturing procedure, so that disc sheels with a composite design of metal and plastic can be produced in a substantially time and cossaving manner. In addition, a more favorable mechanical stress of the disc wheel is to be achieved in operation.

The above and other objects of the invention are achieved by a disc wheel, particularly for rail vehicles, having a hub and a tread and a thrust transmission body of fiber glass-reinforced material between the hub and the tread and comprising two cover discs on opposite sides of the wheel which extend between the hub and the tread, the cover discs being cemented to the hub and tread, the cover discs comprising two similarly designed half shells with spoke-like reinforcement ribs which subdivide the half shells in sector fashion and are inserted between the hub and the tread, the reinforcement ribs each having a longitudinal slot, and web plates connecting the two half shells to each other being inserted into the longitudinal slots.

Thus, a disc wheel according to the invention comprises only a few parts, namely, two half shells, preferably of woven and short-fiber laminations which are made purely by molding techniques; a number corresponding to the number of reinforcement ribs of the half shells which are preferably produced from ±45° woven laminates likewise by molding techniques and may optionally be inserted into the half shells from plastic, and of individual foam blocks which are foamed from plastic for filling the cavity within the disc wheel, and are cemented to the latter.

Both half shells are made by one and the same tool by using woven laminate as sparingly as possible as determined by the necessary stiffness adjustment against radial and axial loads and by the use essentially of random-fiber-reinforced molding compounds. Thus, a very advantageous way of manufacturing is provided. Cementing the half shells to the reinforcement ribs and the rib plates as well as filling the cavities with foam takes place preferably in one operation with extremely simple tools, essentially two pressure plates. Therewith, the manufacturing process for the disc structure is completed.

Joining the metal hub or shaft as well as the tread and the disc structure of the two half shells takes place in a further operation. Due to the chosen geometries of the connecting surfaces at the race and hub or shaft, it is possible, by introducing random fiber-reinforced molding compound into the existing cavities and hardening this compound under pressure and temperature, to create a form- and forcelocking joint. By developing a suitable pressure on this compound during the pressing operation, it is achieved that the dis wheel overall is pre-tensioned under pressure.

In this manufacturing process, the tread is preheated to approximately 80° to 100° C. and its inside contour is spackled in a preliminary operation with molding compound. The procedure with the hub or shaft is the same.

The outer ring, the disc structure and hub or shaft are assembled together in a fixture. By existing drilled holes in the tread and the hub, the random fiber reinforced molding compound is injected into the cavities between the disc structure or hub or tread at elevated temperature. The molding compound is hardened at about 8° to 100° C. in this arrangement. After cooling to room temperature, the compression stress in the disc wheel is increased by the shrinkage of the steel tread. By this double pressure action it can be achieved that the cementing, especially at the tread, is not stressed in transverse tension but only still by transverse compression stress. This is a substantially more advantageous loading state for a cemented joint, especially from the aspect of high dynamic strength of the structure.

By the consistent use of the molding technique and the use of simple tools, a substantial cost advantage is achieved.

BRIEF DESCRIPTION OF THE DRAWINGS

The invention will be explained in greater detail in the following description, making reference to the drawings, in which.

DETAILED DESCRIPTION

Figure 1:
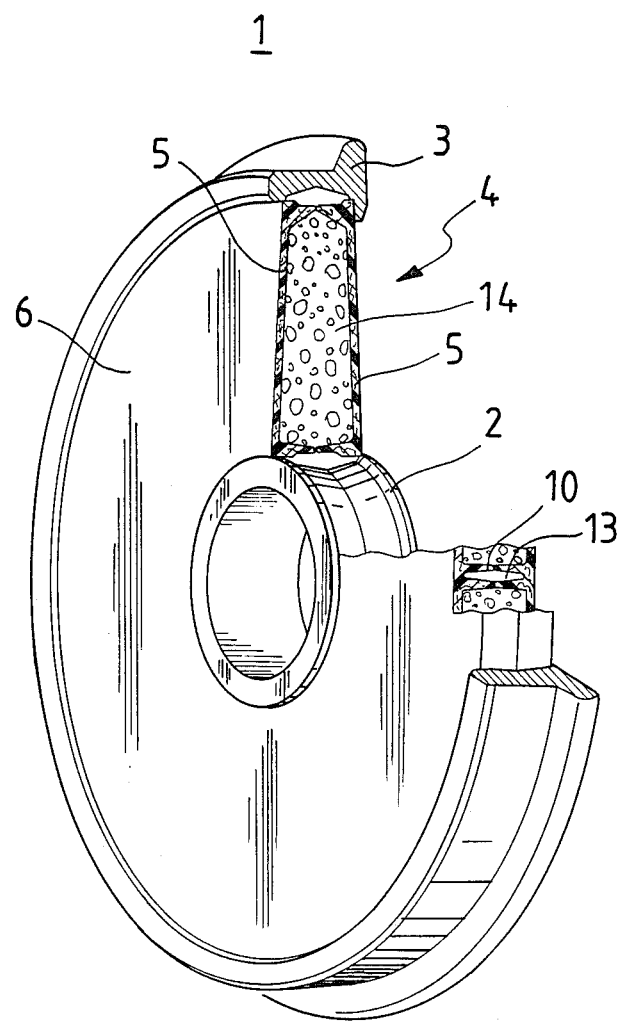
FIG. 1 shows a perspective view, partially cut open, of a disc wheel according to the invention which is constructed from two half shells.

A disc wheel 1 according to FIG. 1, comprises a metallic hub 2 and a metallic tread 3, between which a thrust transmission body 4 is disposed which comprises essentially of two half shells 5 of similar design.

Figure 2:
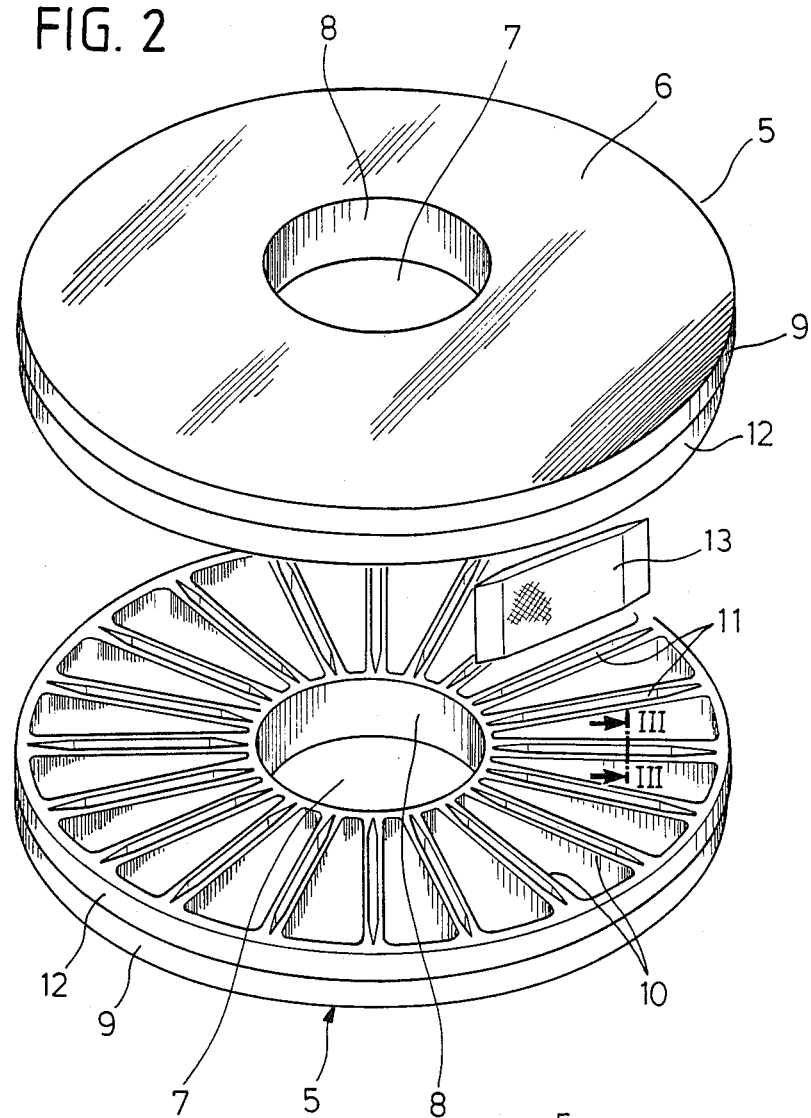
FIG. 2 is an exploded view of the half shells to be joined to each other, for the disc wheel.
Figure 3:
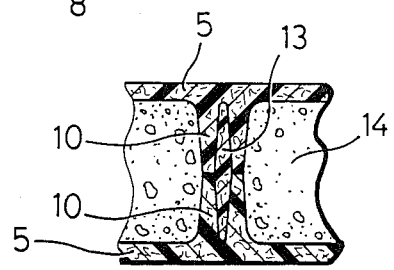
FIG. 3 is a cross section along line III—III of FIG. 2.

The half shells are shown in greater detail in FIG. 2. They have a slightly domed bottom 6 with a central opening 7 for the hub as well as an inner rim rib 8 at the central opening, and an outer rim rib 9. The inner rim rib and the outer rim rib are connected to each other by radial spoke-like reinforcement ribs, in this case sixteen reinforcement ribs 10 which have longitudinal slots 11 extending over approximately their entire length. Each half shell is made in one piece as a molded part of woven and short fiber laminate. Along their open rim, the half shells each have a step-like recess 12 which extends over their entire circumference. Into the longitudinal slots of the reinforcement ribs 10, rib plates 13 of woven laminate with fiber directions of ±45° relative to the longitudinal direction of the rib plates are inserted and cemented. The two half shells 5 are placed on top of each other in such a manner that these rib plates engage with longitudinal slots of both half shells, as shown in FIG. 3. Into the cavities between the individual reinforcement ribs 10, blocks of plastic foam 14 are inserted, or the cavities are filled with foam via openings, not shown here.

Figure 4:
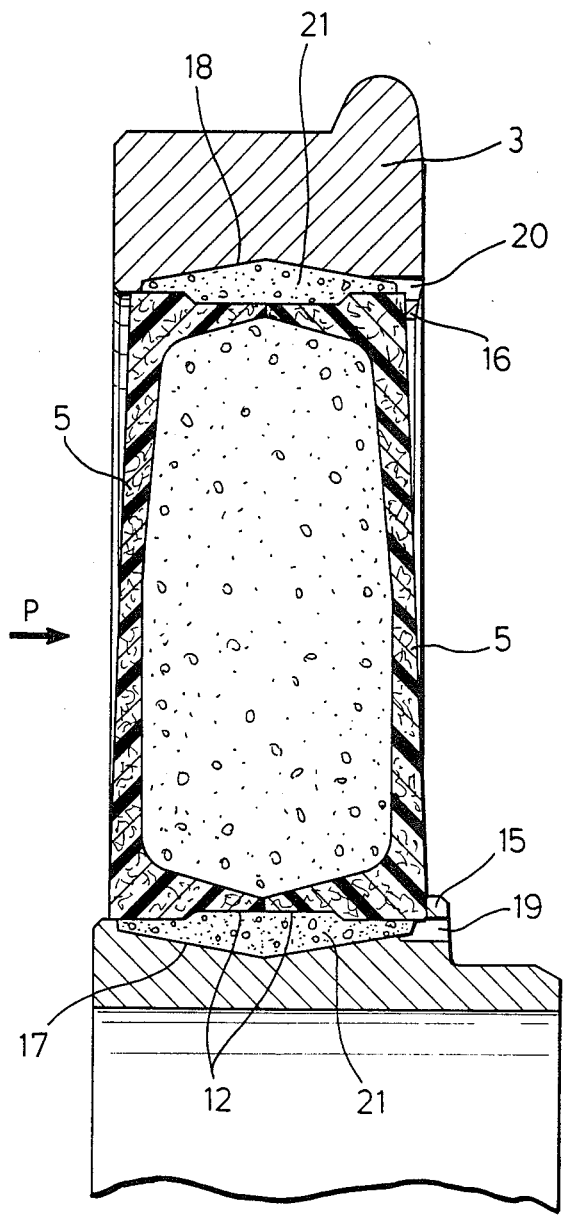
FIG. 4 is a cross section through the half shells in the region between the hub and the tread of the disc wheel.

The entire packet of the assembled and suitably treated half shells 5 is inserted, according to FIG. 4, between the hub 2 and the tread 3 in the direction of the arrow P. For fixing the position, circular stop flanges 15 and 16 are provided at the hub and the tread. The hub 2 and the tread 3 are further provided at their surfaces facing the half shells 5 with approximately V-shaped cuts 17 and 18, which extend approximately over the entire width of the two half shells 5. In this manner, between the half shells and the hub or tread a cavity is provided which is accessible from the outside through holes 19, 20. Through these holes molding compounds 21 of impregnated short fibers are injected into the cavity, which ensure a secure connection between the half shells and the hub or the tread. By the step-like recesses 12 at the half shells, a form- and force-fitting connection with the hub or the tread via the molding compound is possible.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Disc wheel, particularly for rail vehicles, having a hub and a tread and a thrust transmission body of fiber glass-reinforced material between the hub and the tread and comprising two cover discs on opposite sides of the wheel which extend between the hub and the tread, the discs being cemented to the hub and tread, the discs comprising two similarly designed half shells with spoke-like reinforcement ribs which subdivide the half shells in sector fashion and are located between the hub and the tread, the reinforcement ribs each having a longitudinal slot extending substantially between an outer circumferential surface of the hub and on inner circumferential surface of the tread, and web plates connecting the two half shells to each other being inserted into the longitudinal slots.

2. The disc wheel recited in claim 1, wherein the half shells have, between the hub and the tread, a cross section in the shape of an elongated "C".

3. The disc wheel recited in claim 1, wherein at the outer circumferential surface of the hub and the inner circumferential surface of the tread, cuts extending around the circumferences are provided which are opposite to step-like recesses formed in the assembled half shells which extend over the circumference of the half shells, thus forming cavities between the cuts and the steplike recesses, the cavities being filled with a bonding material.

4. The disc wheel recited in claim 3, wherein the bonding material comprises a molding compound of resin-impregnated short fibers.

5. The disc wheel recited in claim 1, wherein cavities are provided in the half shells between adjacent spoke-like reinforcement ribs, the cavities being filled with plastic foam.

* * * * *